C. H. BISSELL.
SCREW.
APPLICATION FILED AUG. 18, 1913.
1,243,799.
Patented Oct. 23, 1917.
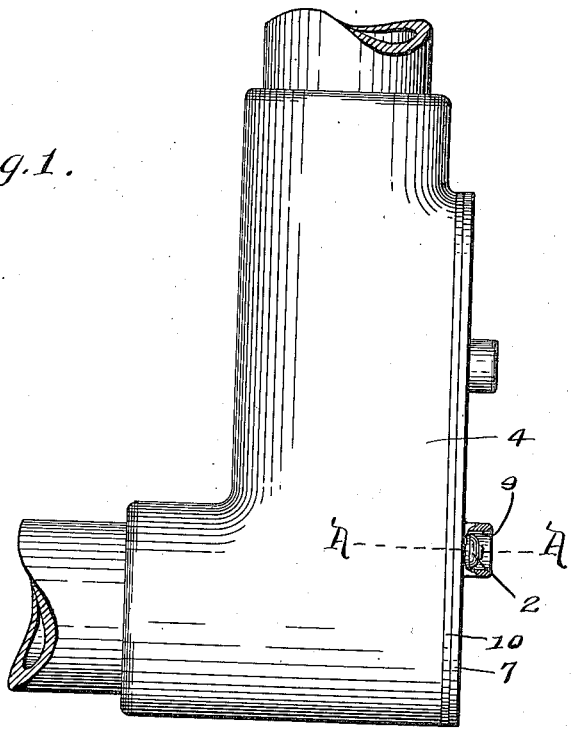
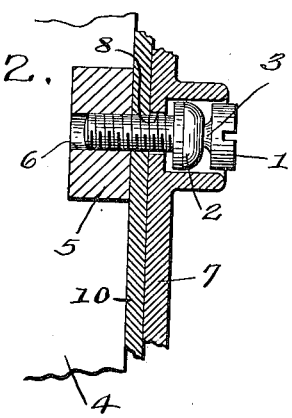
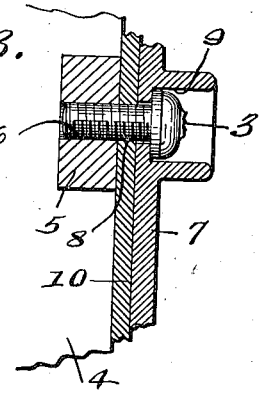
WITNESSES:
Carl H. Bissell,
INVENTOR.
BY
Parsons Hill Bodell,
ATTORNEYS.

UNITED STATES PATENT OFFICE.

CARL H. BISSELL, OF SYRACUSE, NEW YORK, ASSIGNOR TO CROUSE-HINDS COMPANY, OF SYRACUSE, NEW YORK, A CORPORATION OF NEW YORK.

SCREW.

1,243,799.   Specification of Letters Patent.   Patented Oct. 23, 1917.

Application filed August 18, 1913. Serial No. 785,244.

*To all whom it may concern:*

Be it known that I, CARL H. BISSELL, a citizen of the United States, and a resident of Syracuse, in the county of Onondaga and State of New York, have invented a new and useful Screw, of which the following is a specification.

This invention has for its object the production of a screw which cannot be removed with ordinary tools after having been first placed in position, and it consists in the novel features hereinafter set forth and claimed.

I have here shown my invention as adapted to hold the cover of an electrical conduit box in position, and in the drawing:—

Figure 1 is an elevation of the electrical conduit box and cover therefor showing one adaptation of this screw.
Figs. 2 and 3 are enlarged sectional views, partly in elevation, on line A—A, Fig. 1, the outer head of the screw being broken off in Fig. 3 and the screw being shown in Fig. 2 as but partly turned into the screw hole.
This screw is provided with two heads 1, 2, one superposed above the other, the upper head 1 being shaped to receive a screw driving tool and being detachably mounted on the lower head so that after the screw is driven into the screw hole the outer head can be removed, and hence the screw cannot be removed by curious persons.

Preferably, the heads 1 and 2 are connected by a fragile neck 3 of sufficient strength to withstand the torque required to drive the screw into its hole, but fragile enough to break when the lower head strikes the surface around the upper end of the screw hole or the bottom of the countersunk opening in which the screw heads are located, or after the screw has been driven to the required distance in its hole and the head 1 broken off by striking it a sidewise blow.

I have here illustrated the invention as applied to a conduit outlet box for electrical wires and 4 designates such a box having internal lugs 5 formed with threaded screw holes 6; and 7 is the cover for the box, the cover having non-threaded screw holes 8 alined with the holes 6 and sockets 9 in which the screw heads are located. The socket portion 9 is adapted to receive the heads 1 and 2 of the screw, and is of such depth that when the lower screw head is in final position the said socket extends above and so protects the lower screw head. A gasket 10 is usually interposed between the cover and the box.

In operation, after the screw has been turned into the socket 9 by means of the head 1, the upper surface of the head 2 is well within the socket 9 and the outer head 1 is then broken off. Owing to the fact that the walls of the socket project above the head 2 access to the head 2 for the purpose of removing the screw and hence the box cover is rendered extremely difficult. As these boxes are connected in conduits inclosing electrical service wires and are usually located on the outside of buildings where they are liable to be tampered with by boys and other curious persons, this screw is particularly advantageous as such tampering is prevented.

What I claim is:—

A screw having two heads, one superposed above the other, and a fragile neck connecting the heads, the upper head being shaped to receive a screw driving tool, in combination with two parts to be attached together by the screw into one of which the screw threads, the other of said parts being provided with a socket of sufficient depth to receive both heads and having a bottom with which the lower head of the screw engages, the socket being of slightly greater diameter than the lower screw head and extending above the lower screw head when the screw is in its final position, substantially as and for the purpose described.

In testimony whereof, I have hereunto signed my name in the presence of two attesting witnesses, at Syracuse, in the county of Onondaga, in the State of New York, this 15th day of August, 1913.

CARL H. BISSELL.

Witnesses:
RUBY E. S. MITCHELL,
ARTHUR E. VIEAU.